US 11,187,781 B2

(12) United States Patent
Takahashi et al.

(10) Patent No.: US 11,187,781 B2
(45) Date of Patent: Nov. 30, 2021

(54) PULSE GENERATING DEVICE AND OUTPUT ADJUSTMENT METHOD THEREOF

(71) Applicants: FURUKAWA ELECTRIC CO., LTD., Tokyo (JP); FURUKAWA AUTOMOTIVE SYSTEMS INC., Inukami-gun (JP)

(72) Inventors: Kei Takahashi, Tokyo (JP); Taishi Kagimoto, Tokyo (JP); Sadao Matsushima, Tokyo (JP)

(73) Assignees: FURUKAWA ELECTRIC CO., LTD., Tokyo (JP); FURUKAWA AUTOMOTIVE SYSTEMS INC., Inukami-gun (JP)

( * ) Notice: Subject to any disclaimer, the term of this patent is extended or adjusted under 35 U.S.C. 154(b) by 248 days.

(21) Appl. No.: 16/437,523

(22) Filed: Jun. 11, 2019

(65) Prior Publication Data

US 2019/0293754 A1    Sep. 26, 2019

Related U.S. Application Data

(63) Continuation of application No. PCT/JP2017/045737, filed on Dec. 20, 2017.

(30) Foreign Application Priority Data

Dec. 22, 2016    (JP) .............................. JP2016-249247

(51) Int. Cl.
*G01S 7/282* (2006.01)
*G01S 7/40* (2006.01)
*G01K 1/14* (2021.01)

(52) U.S. Cl.
CPC ................ *G01S 7/282* (2013.01); *G01S 7/40* (2013.01); *G01K 1/14* (2013.01)

(58) Field of Classification Search
CPC .............. G01S 7/282; G01S 7/40; G01K 1/14
(Continued)

(56) References Cited

U.S. PATENT DOCUMENTS 4,931,976 A * 6/1990 Olivenbaum ........ H01Q 3/2605
                                                    342/173
5,072,228 A * 12/1991 Kuwahara .............. H01Q 3/267
                                                    342/360

(Continued)

FOREIGN PATENT DOCUMENTS

JP           11-64488 A        3/1999
JP         2014-209110        11/2014

(Continued)

OTHER PUBLICATIONS

International Search Report dated Mar. 3, 2018 in PCT/JP2017/045737 filed Dec. 20, 2017 (with English Translation).

(Continued)

*Primary Examiner* — Bernarr E Gregory
*Assistant Examiner* — Nuzhat Pervin
(74) *Attorney, Agent, or Firm* — Oblon, McClelland, Maier & Neustadt, L.L.P.

(57) ABSTRACT

A pulse generating device of an in-vehicle radar configured to output a high frequency pulse including a main lobe and a side lobe includes a high frequency oscillator that generates a carrier wave of a predetermined frequency, an output variable device that adjusts an output of the high frequency oscillator, a power measuring unit that measures the output of the high frequency oscillator, a temperature measuring unit that measures an ambient temperature, a baseband pulse generating unit that generates a signal of a pulse shape, and a modulator that modulates the output of the high frequency oscillator with the signal of the pulse shape, and, when the ambient temperature is a first threshold value or less, the (Continued)

output or the pulse shape is adjusted so that the side lobe is a predetermined output or less.

18 Claims, 6 Drawing Sheets

(58) Field of Classification Search
USPC .................................................... 342/204
See application file for complete search history.

(56) References Cited

U.S. PATENT DOCUMENTS

| | | | | |
|---|---|---|---|---|
| 5,381,444 | A * | 1/1995 | Tajima | ................... G01S 13/762 342/118 |
| 2003/0006922 | A1 * | 1/2003 | Morimoto | ................ H03K 5/01 341/144 |
| 2005/0249667 | A1 * | 11/2005 | Tuszynski | ................ A61B 8/08 424/9.3 |
| 2005/0259000 | A1 * | 11/2005 | Pennington | ............. G01S 7/282 342/202 |
| 2007/0194978 | A1 * | 8/2007 | Teshirogi | ............. H04B 1/7174 342/28 |
| 2008/0246650 | A1 * | 10/2008 | Teshirogi | ............. G01S 13/106 342/204 |
| 2009/0256740 | A1 * | 10/2009 | Teshirogi | ................ G01S 7/282 342/204 |
| 2011/0095936 | A1 * | 4/2011 | Yuanzhu | ................. G01S 7/282 342/27 |
| 2011/0178612 | A1 * | 7/2011 | Nakatani | .............. G05B 19/054 700/81 |
| 2015/0234036 | A1 * | 8/2015 | Asada | ..................... G01S 13/02 342/175 |
| 2016/0028566 | A1 * | 1/2016 | Ishida | .................... G01S 13/106 375/238 |
| 2018/0128688 | A1 * | 5/2018 | Newell | .................... G01K 1/14 |

FOREIGN PATENT DOCUMENTS

| | | | |
|---|---|---|---|
| JP | 5697066 B1 | 4/2015 | |
| JP | 2016-156732 | 9/2016 | |
| WO | WO-2006080454 A1 * | 8/2006 | ........... H01Q 21/061 |
| WO | WO-2007122873 A1 * | 11/2007 | ............... H01Q 9/27 |
| WO | WO-2012014402 A1 * | 2/2012 | ........... G01S 7/2813 |

OTHER PUBLICATIONS

Extended European Search Report dated May 12, 2020, in Patent Application No. 17883437.0, 14 pages.

* cited by examiner

US 11,187,781 B2

PULSE GENERATING DEVICE AND OUTPUT ADJUSTMENT METHOD THEREOF

TECHNICAL FIELD

The present invention relates to a pulse generating device used in a radar or the like that radiates an impulse by a radio wave and measures a distance to an object and an output adjustment method used in the pulse generating device.

BACKGROUND ART

A common high frequency pulse generating device used in radar device or the like generates a pulse with a predetermined pulse width by a pulse generator, inputs the pulse into a low pass filter having a predetermined frequency characteristic, and generates a pulse with an adjusted shape or the like. Then, the pulse is input to a modulator and multiplied by a carrier wave which is input from a high frequency oscillator of a predetermined frequency to the modulator, so that a high frequency pulse is generated and output. The generated high frequency pulse is radiated from a transmitting antenna and used for measuring a distance to an object or the like.

For the high frequency pulse radiated from the antenna to the outside, a frequency band and the like permitted by legal regulations are specified so that interference with other wireless devices or the like is prevented. For this reason, a technique for adjusting a pulse pattern of a high frequency pulse so that the high frequency pulse complies with the legal regulations has been developed. In Patent Document 1, the present applicants have proposed a pulse generating device that suitably adjusts and outputs a pulse pattern with a simpler configuration.

A technique of using a pulse string including two or more pulses as a pulse input to a low pass filter and suitably adjusting a pulse pattern of a high frequency pulse by adjusting the pulse string instead of adjusting a pulse shape or the like by the low pass filter as in the pulse generating device of the related art is disclosed in Patent Document 1.

CITATION LIST

Patent Document

Patent Document 1: JP 5697066 B

SUMMARY OF THE INVENTION

Problem to be Solved by the Invention

According to the invention, it is possible to realize a suitable pulse pattern conforming to legal regulations with a simpler configuration. However, depending on changes in environments (such as an ambient temperature) in which the pulse generating device is used, aged deterioration, or the like, the pulse pattern is likely to change due to a temperature characteristic of an internal high frequency oscillator or a modulator, an output decrease caused by aged deterioration, or the like. Overseas, it is subject to a temperature change from about −40° C. to 90° C. depending on an area. Therefore, if the pulse pattern of the high frequency pulse changes considerably from a state in which it is suitably adjusted (for example, at the time of shipping at normal temperature and normal humidity), when it is installed in a radar device, non-detection or erroneous detection of an object, deviation from legal regulations, interference with other radio equipment, or the like is likely to occur.

For example, if the output of the pulse generating device increases, a reflected wave caused by a distant object (a reflective object) is also detected with relatively high intensity. Therefore, when there is a reflective object beyond a distance corresponding to a transmission repeating period, the reflected wave is mixed in a reception signal as a so-called multi-order echo. As a result, a problem (erroneous detection) in that a distance to an object is calculated on the basis of the multi-order echo and thus is detected to be shorter than an actual distance occurs.

Further, the high frequency pulse signal output from the pulse generating device is coupled between the transmitting and receiving antennas and becomes noise (a background signal) of the reception signal of the radar device. However, if the output increases, the noise also increases, and if the increase reaches the extent that it saturates an A/D converter in the radar device, particularly, a reflected wave caused by a near object is buried in the noise, and a problem (non-detection) in that the object is not detected occurs.

Further, if the output of the pulse generating device increases, it is likely to deviate from legal regulations and cause interference with other wireless devices or the like.

On the other hand, when the output of the pulse generating device decreases, since the received signal of the radar device becomes too small, non-detection in which a reflected wave caused by an object is not detected is likely to occur.

As described above, if the high frequency pulse which is the output of the pulse generating device changes greatly from the adjusted condition at the time of shipping, it causes various problems. For example, when it is installed in a radar device of an automobile, it is likely to induce an unexpected accident caused by due to erroneous detection or non-detection of an object or to function as an interfering radio wave and incur a malfunction of other wireless devices.

The invention has made in light of the above problems, and it is an object of the invention to provide a pulse generating device and an output adjustment method which are capable of adjusting an output to be within a predetermined range even when a change in a use temperature or aged deterioration occurs.

Means for Solving Problem

In order to solve the above problems, a pulse generating device according to the invention is a pulse generating device of an in-vehicle radar that outputs a high frequency pulse including a main lobe and a side lobe, and includes a high frequency oscillator that generates a carrier wave of a predetermined frequency, an output variable device that adjusts an output of the high frequency oscillator, a power measuring unit that measures the output of the high frequency oscillator, a temperature measuring unit that measures an ambient temperature, a baseband pulse generating unit that generates a signal of a pulse shape, and a modulator that modulates the output of the high frequency oscillator with the signal of the pulse shape, in which, when the ambient temperature is a first threshold value or less, at least one of the output and the pulse shape is adjusted so that the side lobe is a predetermined output or less.

In order to solve the above problems, another aspect of a pulse generating device according to the invention is a pulse generating device that outputs an output of the modulator as a high frequency pulse, and includes a high frequency oscillator that generates a carrier wave of a predetermined frequency, an output variable device that adjusts an output of the high frequency oscillator, a power measuring unit that measures the output of the high frequency oscillator, a temperature measuring unit that measures an ambient temperature, a baseband pulse generating unit including a pulse generator that generates a pulse having a predetermined pulse width and a low pass filter that adjusts a shape of a pulse output from the pulse generator, the baseband pulse generating unit generating a signal of a pulse shape, and a modulator that modulates the output of the high frequency oscillator with the signal of the pulse shape output from the baseband pulse generating unit, in which, when the ambient temperature exceeds a first threshold value, the output variable device adjusts the output of the high frequency oscillator in accordance with a measurement result of the power measuring unit, and when the ambient temperature is the first threshold value or less, an output of the high frequency pulse is adjusted within a predetermined range by performing at least one of adjusting the output of the high frequency oscillator by the output variable device and modifying and adjusting a shape of the signal of the pulse shape by the baseband pulse generating unit in accordance with a measurement result of the temperature measuring unit.

Further, in order to solve the above-mentioned problem, in the pulse generating device according to the invention, in a case in which, when the ambient temperature exceeds the first threshold value, the output variable device adjusts the output of the high frequency oscillator in accordance with the measurement result of the power measuring unit, and when the ambient temperature is the first threshold value or less, the output variable device adjusts the output of the high frequency oscillator in accordance with the measurement result of the temperature measuring unit, a variation amount of the output of the high frequency oscillator which is adjusted in accordance with the measurement result of the temperature measuring unit is larger than a variation amount of the output of the high frequency oscillator which is adjusted in accordance with the measurement result of the power measuring unit.

Further, in order to solve the above-mentioned problem, in the pulse generating device according to the invention, in a case in which, when the ambient temperature exceeds the first threshold value, the output variable device adjusts the output of the high frequency oscillator in accordance with the measurement result of the power measuring unit, and when the ambient temperature is the first threshold value or less, the output variable device adjusts the output of the high frequency oscillator in accordance with the measurement result of the temperature measuring unit, the adjustment of the output of the high frequency oscillator according to the measurement result of the temperature measuring unit includes causing the output of the high frequency oscillator to vary twice or more with a variation amount smaller than a variation amount of the output of the high frequency oscillator which is adjusted in accordance with the measurement result of the power measuring unit.

Further, in order to solve the above-mentioned problem, preferably, in the pulse generating device according to the invention, when the ambient temperature is equal to or lower than a second threshold value which is lower than the first threshold value, the output variable device adjusts the output of the high frequency oscillator and the baseband pulse generating unit modifies and adjusts a shape of the signal of the pulse shape in accordance with the measurement result of the temperature measuring unit.

Further, in order to solve the above-mentioned problem, preferably, in the pulse generating device according to the invention, the baseband pulse generating unit further includes a pulse generator that generates a pulse having a predetermined pulse width and a timing generator that outputs a control signal to the pulse generator, and the pulse generator generates a pulse string.

Further, in order to solve the above-mentioned problem, preferably, in the pulse generating device according to the invention, the baseband pulse generating unit further includes a pulse generator that generates a pulse having a predetermined pulse width and a pattern memory that stores a control pattern when a predetermined pulse pattern is output from the pulse generator.

In order to solve the above problems, an output adjustment method of a pulse generating device according to the invention is an output adjustment method of a pulse generating device of an in-vehicle radar that modulates a carrier wave of a predetermined frequency with a signal of a pulse shape and outputs a resulting signal as a high frequency pulse including a main lobe and a side lobe, and includes a step of acquiring a power measurement value of the carrier wave, a step of acquiring a temperature measurement value of an ambient temperature, a step of adjusting an output of the carrier wave, and a step of modifying and adjusting a shape of the signal of the pulse shape, in which, when the temperature measurement value is a first threshold value or less, at least one of a step of adjusting the output of the carrier wave so that the side lobe is a predetermined output or less and a step of modifying and adjusting the shape of the signal of the pulse shape is performed.

Further, in order to solve the above problems, another aspect of an output adjustment method of a pulse generating device according to the invention is an output adjustment method used in a pulse generating device that modulates a carrier wave of a predetermined frequency with a signal of a pulse shape and outputs a resulting signal as a high frequency pulse, and includes a step of acquiring a power measurement value of the carrier wave, a step of acquiring a temperature measurement value of an ambient temperature, a step of adjusting an output of the carrier wave in accordance with the power measurement value, a step of adjusting the output of the carrier wave in accordance with the temperature measurement value, and a step of modifying and adjusting a shape of the signal of the pulse shape in accordance with the temperature measurement value, when the temperature measurement value exceeds a first threshold value, a step of adjusting the output of the carrier wave in accordance with the power measurement value is performed, and when the temperature measurement value is the first threshold value or less, the output of the high frequency pulse is adjusted within a predetermined range by performing at least one of a step of adjusting the output of the carrier wave and a step of modifying or adjusting a shape of the signal of the pulse shape in accordance with the temperature measurement value.

Further, in order to solve the above-mentioned problem, in the output adjustment method of the pulse generating device according to the invention, in a case in which when the temperature measurement value exceeds a first threshold value, the step of adjusting the output of the carrier wave in accordance with the power measurement value is performed, and when the temperature measurement value is the first threshold value or less, the step of adjusting the output of the carrier wave in accordance with the temperature measurement value is performed, a variation amount of the output of the carrier wave which is adjusted in accordance with the temperature measurement value is greater than a variation amount of the output of the carrier wave which is adjusted in accordance with the power measurement value.

Further, in order to solve the above-mentioned problem, in the output adjustment method of the pulse generating device according to the invention, in a case in which when the temperature measurement value exceeds a first threshold value, the step of adjusting the output of the carrier wave in accordance with the power measurement value is performed, and when the temperature measurement value is the first threshold value or less, the step of adjusting the output of the carrier wave in accordance with the temperature measurement value is performed, the adjustment of the output of the carrier wave according to the temperature measurement value includes causing the output of the carrier wave to vary twice or more with a variation amount smaller than a variation amount of the power of the carrier wave which is adjusted in accordance with the power measurement value.

Further, in order to solve the above-mentioned problem, preferably, in the output adjustment method of the pulse generating device according to the invention, when the temperature measurement value is equal to or lower than a second threshold value which is lower than the first threshold value, both of the step of adjusting the output of the carrier wave in accordance with the temperature measurement value and the step of modifying and adjusting the shape of the signal of the pulse shape are performed.

Further, in order to solve the above-mentioned problem, preferably, in the output adjustment method of the pulse generating device according to the invention, the signal of the pulse shape is generated on the basis of a pulse string including two or more monopulses of a predetermined pulse width, and in the step of modifying and adjusting the shape of the signal of the pulse shape within a predetermined range, at least one of the pulse width, the number of monopulses, and an interval between the monopulses is adjusted.

Effect of the Invention

According to the pulse generating device and the output adjustment method according to the invention, it is possible to adjust an output of a generated high frequency pulse to be within a predetermined range even when a change in an ambient temperature or aged deterioration occurs.

BRIEF DESCRIPTION OF DRAWINGS

FIG. 2(A) is a diagram illustrating a variation in an output waveform caused by a temperature change, FIG. 2(B) is a diagram illustrating an adjustment by an output of a high frequency oscillator against a variation in an output waveform, and FIG. 2(C) is a diagram illustrating an adjustment by a baseband pulse generating unit against a variation in an output waveform.

MODE(S) FOR CARRYING OUT THE INVENTION

Hereinafter, an embodiment of the invention will be described with reference to the appended drawings.

Figure 1:
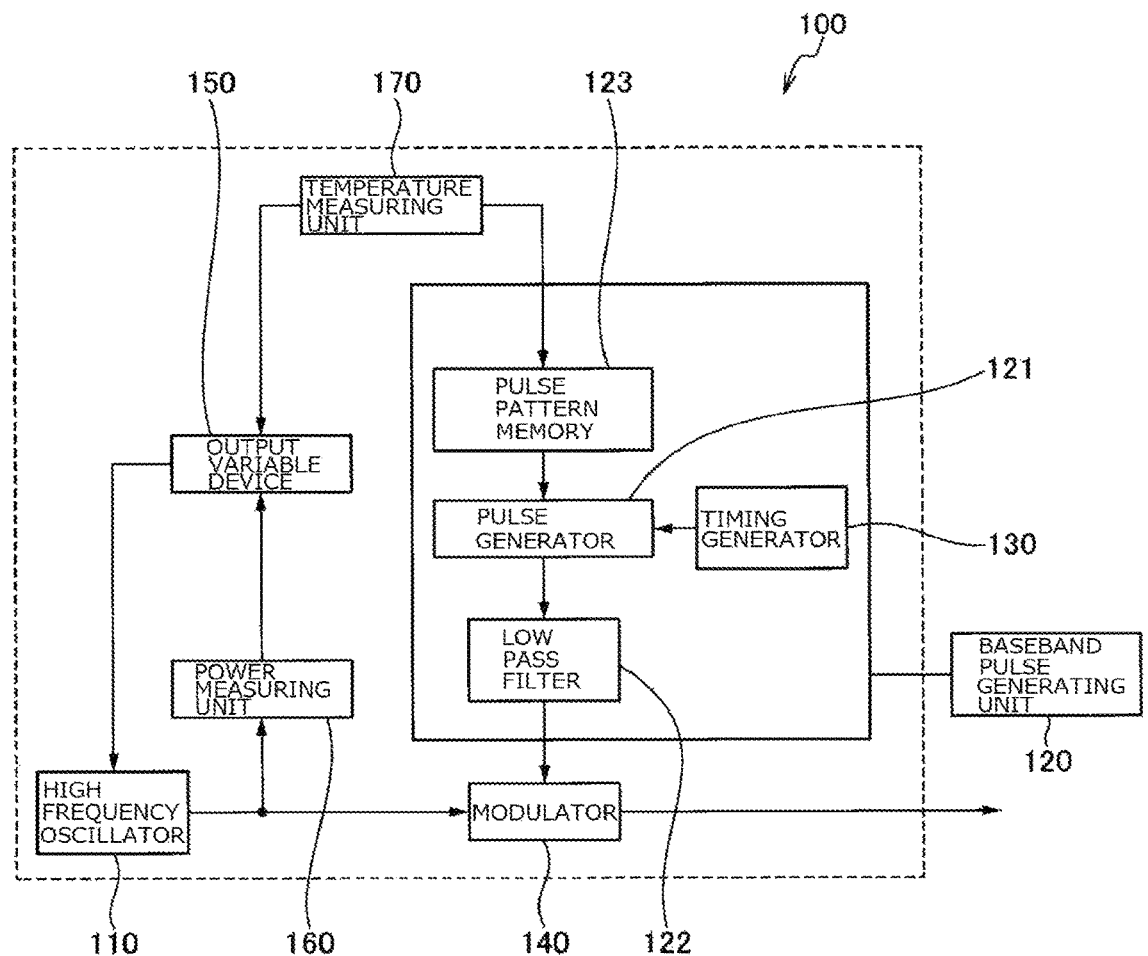
FIG. 1 is a block diagram illustrating a configuration of a pulse generating device according to an embodiment of the invention.

FIG. 1 is a block diagram illustrating a configuration of a pulse generating device 100 according to an embodiment of the invention. The pulse generating device 100 of the present embodiment is a device that generates a high frequency pulse as an output and can be used in, for example, a radar device of an automobile. When it is installed in the radar device, the output high frequency pulse is radiated from a transmitting antenna of the radar device and reflected by an object. Then, the radar device can measure a distance from the automobile to the object by detecting the reflected wave as a reception signal.

As illustrated in FIG. 1, the pulse generating device 100 includes a high frequency oscillator 110 that generates a carrier wave of a predetermined frequency, an output variable device 150 that adjusts an output of the high frequency oscillator 110, a power measuring unit 160 that measures an output of the high frequency oscillator 110, a temperature measuring unit 170 that measures an ambient temperature at which the pulse generating device 100 is used, a baseband pulse generating unit 120 that generates a pulse shape signal, and a modulator 140 that modulates a carrier wave output from the high frequency oscillator 110 with the pulse shape signal output from the baseband pulse generating unit 120. The pulse generating device 100 outputs the output of the modulator 140 as the high frequency pulse.

The predetermined frequency of the carrier wave generated by the high frequency oscillator 110 can be, for example, 24 GHz, and in this case, the high frequency pulse is a radio wave of a 24 GHz band.

The power measuring unit 160 measures power which is the output of the high frequency oscillator 110. When a measurement result (measurement value) deviates from a predetermined power range, the output variable device 150 operates to causes the output of the high frequency oscillator 110 (an input of the modulator 140) to be changed. Accordingly, an amplitude of the high frequency pulse which is the output of the pulse generating device 100 (the output of the modulator 140) can be adjusted. As the power measuring unit 160, for example, a power meter can be used, but the invention is not limited to this example.

The output of the high frequency oscillator 110 usually increases as the used ambient temperature decreases, and conversely decreases as the ambient temperature increases. Further, the output of the high frequency oscillator 110 usually decreases due to aged deterioration. Such a change in the output of the high frequency oscillator 110 can be measured by the power measuring unit 160.

The temperature measuring unit 170 measures the ambient temperature at which the pulse generating device 100 is used. As the ambient temperature, for example, the temperature around the pulse generating device 100 may be measured, or the temperatures of a pulse generator 121, a high frequency oscillator 110, the modulator 140, or the like may be measured. In a case in which the temperature of the high frequency oscillator 110 or the modulator 140 is measured, a portion propagated by the high frequencies propagate is preferable from a viewpoint that a characteristic thereof changes sensitively to a temperature. Further, a temperature of a part of the pulse generating device 100 which is likely to become a high temperature (for example, a portion in which the pulse generator 121, a pulse pattern memory 123, and the like are densely arranged or the like) may be measured from a viewpoint of prevention of a failure caused by heat. In order to measure an ambient temperature in which influence of heat generation of each element is reduced, the ambient temperature may be measured apart from the high frequency oscillator 110, the densely arranged portion, and the like. Further, a measurement result of the temperature measuring unit 170 can be used as a measurement value of the ambient temperature, but the ambient temperature may be estimated from the measurement result.

When the ambient temperature deviates from a predetermined temperature range 1, the output variable device 150 operates to cause the output of the high frequency oscillator 110 to be changed. Accordingly, the amplitude of the high frequency pulse which is the output of the pulse generating device 100 can be adjusted.

If the ambient temperature changes, in addition to the output of the high frequency oscillator 110 described above, outputs of other components included in the pulse generating device 100 change. Particularly, on a low temperature side, influence of a temperature characteristic of the modulator 140 increases. Due to the influence of the temperature characteristic of the modulator 140, usually, the amplitude of the high frequency pulse increases as the ambient temperature used decreases, and conversely decreases as the ambient temperature increases.

Therefore, since the ambient temperature is measured by the temperature measuring unit 170 in addition to the power measuring unit 160 that measures the change in the output of the high frequency oscillator 110, the output of the high frequency oscillator 110 can be adjusted in accordance with the temperature characteristic of the modulator 140 or the like. As a result, the amplitude adjustment of the high frequency pulse in which the temperature characteristic of other components such as the modulator 140 is considered in addition to the temperature characteristic of the high frequency oscillator 110 can be realized.

Further, when the measurement value of the temperature measuring unit 170 deviates from a predetermined temperature range 2, the pulse generating device 100 according to the invention modifies and adjusts the shape of the high frequency pulse serving as the output by the baseband pulse generating unit 120 as will be described later.

The predetermined temperature range 1 in which the output adjustment of the high frequency oscillator 110 is performed on the basis of the measurement value of the temperature measuring unit 170 and a predetermined temperature range 2 in which the adjustment by baseband pulse generating unit 120 (hereinafter referred to as a "pulse adjustment") is performed may be the same range, may be different ranges, or may be partially the same range. In other words, since the two predetermined temperature ranges are set, it is possible to adjust the high frequency pulse by using either or both of the output adjustment and the pulse adjustment of the high frequency oscillator 110. As the temperature measuring unit 170, for example, a temperature sensor can be used, but the invention is not limited thereto.

The baseband pulse generating unit 120 according to the present embodiment includes a pulse generator 121 that generates a pulse of a predetermined pulse width, a low pass filter 122 that adjusts the shape of the pulse output from the pulse generator 121, a timing generator 130 that outputs a predetermined control signal of the pulse generator 121, and a pulse pattern memory 123 that stores a control pattern of the pulse output from the pulse generator 121. The timing generator 130 and the pulse pattern memory 123 are not necessarily required as the baseband pulse generating unit 120 according to the invention.

The pulse generator 121 causes a monopulse (single pulse) or a pulse string including two or more monopulses to be output, and the output is input to the low pass filter 122. The low pass filter 122 can adjust the shape of the pulse input from the pulse generator 121 by cutting off or attenuating a frequency component higher than a predetermined cutoff frequency. The pulse whose shape is adjusted by the low pass filter 122 becomes a signal of pulse shape which is the output of the baseband pulse generating unit 120.

The timing generator 130 can use the pulse string as the output of the pulse generator 121 in accordance with the control signal serving as an output thereof. The number of monopulses constituting the pulse string, the pulse width (bit width) of each monopulse, or an interval of the monopulses can be arbitrarily adjusted in accordance with the control signal of the timing generator 130. If the pulse string output from the pulse generator 121 is adjusted in accordance with any one of the number of monopulses constituting the pulse string, the bit width of each monopulse, or the interval of the monopulses, or a combination thereof, the shape of the signal of the pulse shape which is the output of the baseband pulse generating unit 120 can be adjusted.

The pulse pattern memory 123 can store the pattern (control pattern) of the control signal output from the timing generator 130. Accordingly, instead of receiving the control signal from the timing generator 130 and generating a predetermined pulse string by the pulse generator 121, it is possible to input the control pattern stored in the pulse pattern memory 123 to the pulse generator 121 and generate a predetermined pulse.

As described above, it is possible to adjust the shape of the signal of the pulse shape which is the output of the baseband pulse generating unit 120 using either or both of the low pass filter 122 and the timing generator 130 (the pulse pattern memory 123 in a case in which the output of the pulse pattern memory 123 is input to the pulse generator 121 instead of the timing generator 130) in combination. In other words, when the pulse generator 121 outputs the monopulse, the shape of the pulse which is the output of the baseband pulse generating unit 120 can be adjusted by the low pass filter 122. Further, when the pulse generator 121 outputs the pulse string, it is possible to adjust the shape of the pulse serving as the output of the baseband pulse generating unit 120 using either or both the low pass filter 122 and the timing generator 130 (or the pulse pattern memory 123) in combination. When both are used in combination, a finer adjustment can be performed.

If the output of the baseband pulse generating unit 120 with the adjusted shape is input to the modulator 140, the shape of the high frequency pulse which is the output of the modulator 140 (the output of the pulse generating device 100) can be adjusted. As described above, the shape of the high frequency pulse can be modified and adjusted by the pulse adjustment.

Figure 2A:
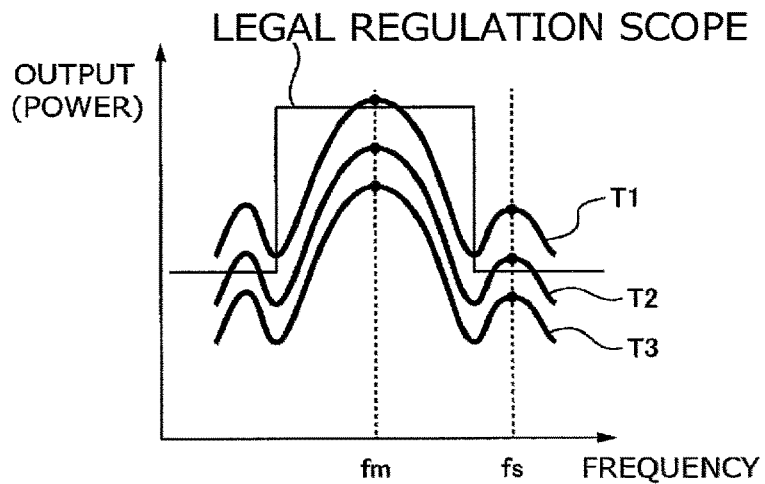
FIGS. 2(A) to 2(C) are frequency waveform diagrams of a high frequency pulse which is an output of a pulse generating device.
Figure 2B:
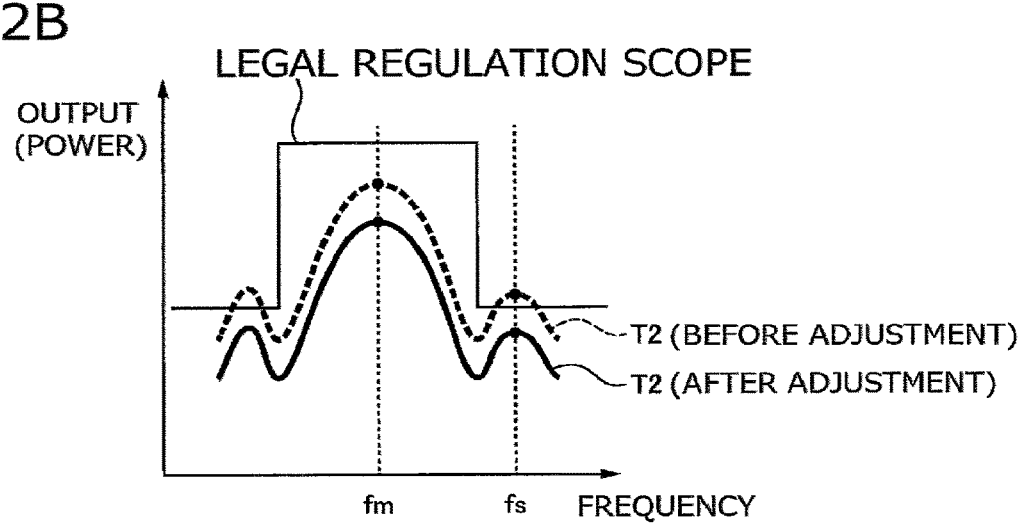
Figure 2C:
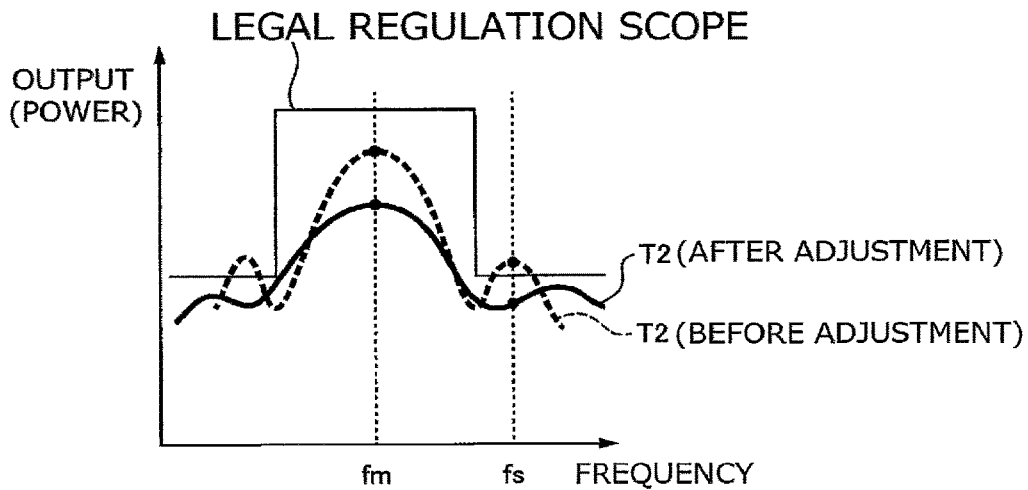

Next, an example of the output adjustment of the high frequency oscillator 110 based on the measurement value of the temperature measuring unit 170 and the output adjustment by the pulse adjustment will be described with reference to FIG. 2. FIGS. 2(A) to 2(C) are frequency waveform diagrams of the high frequency pulse which is the output of the pulse generating device in which a vertical axis indicates the output (power) of the pulse generating device 100, and a horizontal axis indicates a frequency. FIG. 2(A) is a diagram illustrating a variation in a waveform caused by a temperature change, FIG. 2(B) is a diagram illustrating an adjustment by an output of the high frequency oscillator against a variation in a waveform, and FIG. 2(C) is a diagram illustrating a pulse adjustment against a variation in a waveform.

In a case in which a temperature measurement value T of the temperature measuring unit 170 changes as illustrated in FIG. 2(A), if the temperature decreases in the order of T3, T2, and T1 (T3>T2>T1), the output of the pulse generating device 100 increases overall in the use frequency band due to the temperature characteristic of the high frequency oscillator 110 or the modulator 140, and the output waveform is shifted upwards.

At the temperature T3, the output of pulse generating device 100 is within the legal regulation scope. However, when the temperature drops to T2, there arises a problem in that a side lobe of the output waveform deviates from the legal regulation scope, and the output exceeds the legal regulation scope at a frequency fs at which the side lobe become maximum. Further, when temperature drops to T1, both the side lobe and the main lobe deviate from the legal regulation scope, and the output exceeds the legal regulation scope at both of the frequencies fs and fm at which each of the side lobe and the main lobe become a maximum value.

FIG. 2(B) illustrates an example of the output adjustment of the high frequency pulse by the output adjustment of the high frequency oscillator 110 against a variation caused by such a temperature change. In the output waveform of the high frequency pulse before the adjustment, similarly to FIG. 2(A), the side lobe deviates from the legal regulation scope at the use temperature T2, and the output of the high frequency pulse exceeds the legal regulation scope at the frequency fs at which the side lobe becomes a maximum value. On the other hand, when the output of the high frequency oscillator 110 is lowered, the output of the high frequency pulse decreases overall in the use frequency band, and the output waveform (the adjusted output waveform in FIG. 2(B)) of the high frequency pulse is shifted downwards. As a result, the output of the high frequency pulse is adjusted to fall within the legal regulation scope even at the frequency fs.

FIG. 2(C) illustrates an example of the output adjustment of the high frequency pulse by the pulse adjustment. In the output waveform of the high frequency pulse before the adjustment, similarly to FIG. 2(A), the side lobe deviates from the legal regulation scope at the temperature T2, and the output of the high frequency pulse exceeds the legal regulation scope at the frequency fs at which the side lobe becomes a maximum value. On the other hand, when the pulse adjustment is performed, the shape of the output waveform of the high frequency pulse can be changed. In FIG. 2(C), the output waveform (the adjusted output waveform in FIG. 2(C)) of the high frequency pulse is modified such that both the main lobe and the side lobe becomes gentle mountain shapes, and the frequency band is increased. As a result, the output of the high frequency pulse decreases at the frequencies fm and fs at which each of the side lobe and the main lobe becomes a maximum value and is adjusted to fall within the legal regulation scope even at the frequency fs.

Such a modification of the output waveform of the high frequency pulse is realized by reducing the number of monopulses constituting the pulse string or by adjusting the shape of the signal of the pulse shape which is the output of the baseband pulse generating unit 120 using the low pass filter 122.

In the present example, an adjustment of narrowing the pulse width on the time axis of the shape of the signal of the pulse shape which is the output of the baseband pulse generating unit 120 is performed by decreasing the number of monopulses constituting the pulse string in accordance with the control signal of the timing generator 130. Accordingly, as illustrated in FIG. 2(C), an adjustment of increasing the width of the main lobe and the side lobe on a frequency axis of the high frequency pulse which is the output of the pulse generating device 100 is realized.

FIGS. 2(B) and 2(C) illustrate the examples of the output adjustment of the high frequency oscillator 110 and the output adjustment examples of the high frequency pulse by the pulse adjustment, but both examples may be combined. For example, when both the side lobe and the main lobe of the output waveform deviate from the legal regulation scope, and the output of the high frequency pulse greatly exceed the legal regulation scope as the temperature drops greatly as indicated by the use temperature T1 in FIG. 2(A), there are cases in which the adjustment is unable to be performed since one of them falls within the legal regulation scope. In this case, using both examples in combination is effective.

Specifically, in the output waveform at the temperature T1 in FIG. 2A, the output is reduced by the output adjustment of the high frequency oscillator 110 to an extent that it substantially coincides with the output waveform at the temperature T2 in FIG. 2(A). Then, when it is modified as in the output waveform after the adjustment at the temperature T2 in FIG. 2(C), it can be adjusted to the legal regulation scope even at the temperature T1 by the pulse adjustment.

As described above, when the output adjustment and the pulse adjustment of the high frequency oscillator 110 are used in combination, the predetermined temperature ranges 1 and 2 in which the output adjustment and the pulse adjustment of the high frequency oscillator 110 are executed are set to include the same range. Since both adjustments are carried out together in the same range, it is possible to adjust the output of the high frequency pulse using both adjustments.

In FIG. 2, the adjustment example in a case in which the output of the high frequency pulse increases with the decrease in the ambient temperature has been described, but conversely, a similar adjustment method can be used even when the output of the high frequency pulse decreases with the increase in the ambient temperature.

Figure 3:
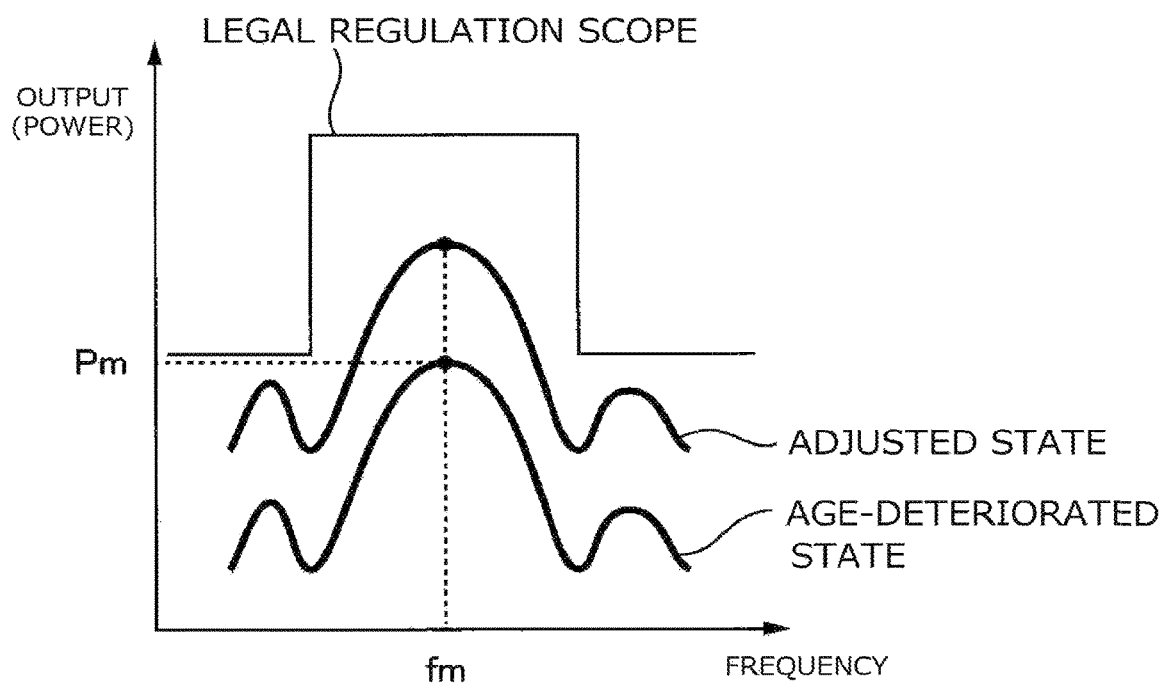
FIG. 3 is a frequency waveform diagram of a high frequency pulse which is an output of a pulse generating device, and is a diagram illustrating an output decrease of an output waveform caused by aged deterioration.

Next, the example of the output adjustment of the high frequency pulse by the output adjustment of the high frequency oscillator 110 based on the measurement value of the power measuring unit 160 will be described with reference to FIG. 3. FIG. 3 is a frequency waveform diagram of the high frequency pulse which is the output of the pulse generating device in which a vertical axis indicates the output (power) of the high frequency pulse, and a horizontal axis indicates the frequency and illustrates the output waveform in the state in which the output is adjusted (for example, at the time of shipping) and an example in which the output is decreased due to aged deterioration.

In a case in which the output drops as illustrated in FIG. 3, a problem of deviating from the legal regulation scope specifying the upper limit as illustrated in FIG. 2 usually does not occur, but there arises a problem in that the output reduction causes problems such as object non-detection in a case in which it is installed in the radar device. For this reason, an adjustment of increasing the output is performed.

The power measuring unit 160 measures power Pm at a frequency of a carrier wave generated by the high frequency oscillator 110, that is, the frequency fm at which the main lobe becomes maximum. In a case in which the measurement value Pm falls below a predetermined threshold value, the output variable device 150 is operated to increase the output of the high frequency oscillator 110. Accordingly, the output of the high frequency pulse is increased overall at the use frequency band, and the output waveform is shifted upwards. As described above, it is possible to return the high frequency pulse which is the output of the pulse generating device 100 to the adjusted state (for example, at the time of shipping).

In FIG. 3, the example in which, when the output of the high frequency pulse is decreased by the aged deterioration, the output of the high frequency oscillator 110 is increased, and the output of the high frequency pulse is increased has been described, but when the output of the high frequency pulse is increased to the extent that the legal regulation scope is exceeded, the adjustment of decreasing the output of the high frequency oscillator 110 and decreasing the output of the high frequency pulse is performed.

Figure 4:
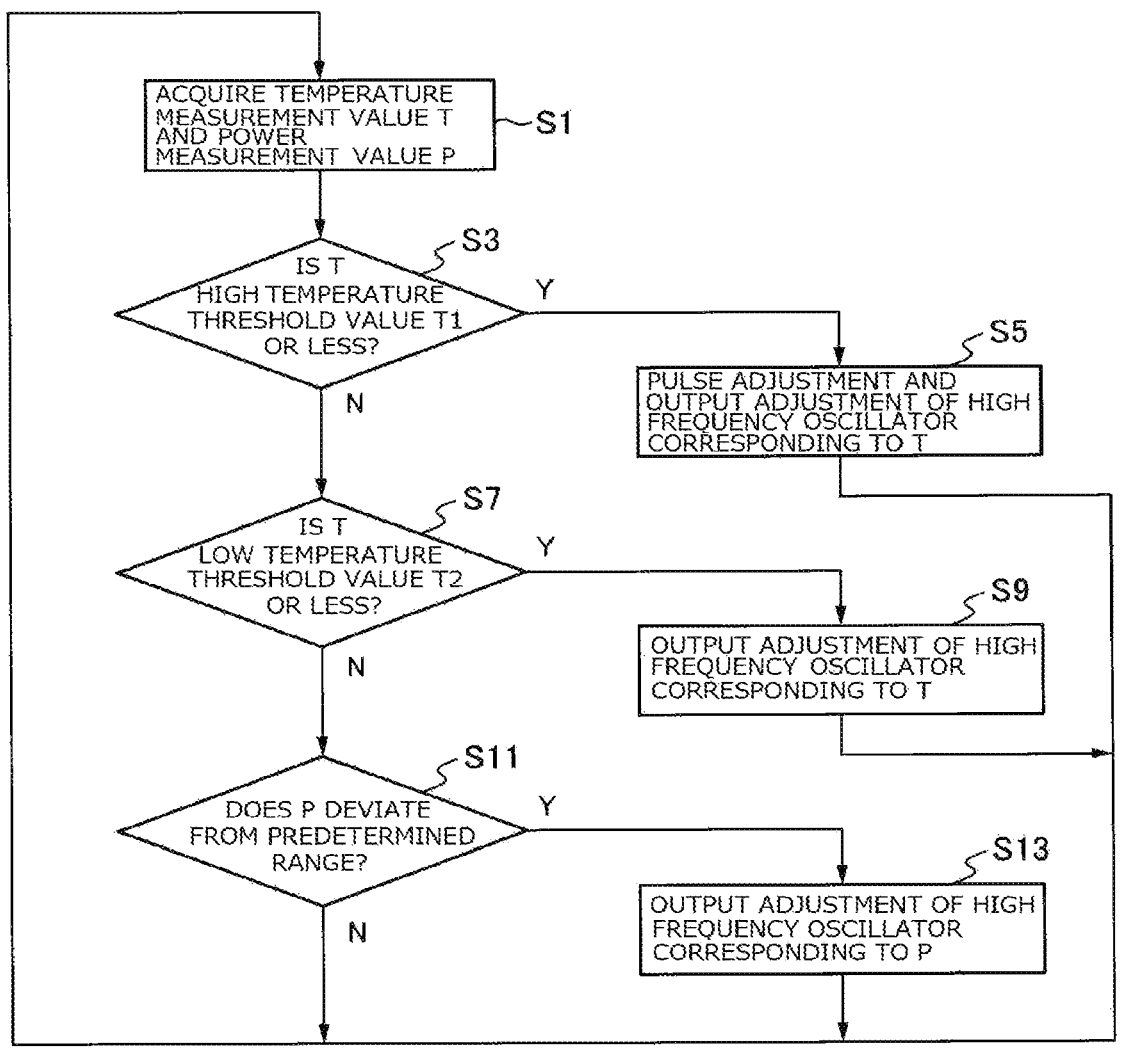
FIG. 4 is a flowchart illustrating an output adjustment method of a pulse generating device according to an embodiment of the invention.

FIG. 4 is a flowchart illustrating an embodiment of an output adjustment method of the pulse generating device 100 according to the invention. According to the flowchart illustrated in FIG. 4, the output of the pulse generating device of FIG. 1 is adjusted on the basis of the measurement results (the measurement values) of the power measuring unit 160 and the temperature measuring unit 170.

In the flowchart of FIG. 4, the predetermined temperature range 2 in which the pulse adjustment is performed is set to be lower the temperature threshold value T1 or less, the predetermined temperature range 1 in which the output adjustment of the high frequency oscillator 110 is performed is set to be the high temperature threshold value T2 or less, and the predetermined temperature ranges 1 and 2 are in the same range below the low temperature threshold value T1.

The pulse generating device 100 first acquires the temperature measurement value T by the temperature measuring unit 170 and the power measurement value P by the power measuring unit 160 (step S1). When the temperature measurement value T is the low temperature threshold value T1 or less (step S3, Y), the ambient temperature is a low temperature, and the high frequency pulse output increases beyond the legal regulation scope as illustrated in FIG. 2(A). Therefore, the output adjustment of the high frequency pulse is performed using the pulse adjustment and the output adjustment of the high frequency oscillator 110 described with reference to FIGS. 2(B) and 2(C) in combination (step S5).

When the temperature measurement value T exceeds the low temperature threshold value T1 (step S3, N) and is equal to or less than the high temperature threshold value T2 which is higher than the low temperature threshold value T1 (step S7, Y), the output adjustment by the high frequency oscillator 110 is performed (step S9) as illustrated in FIG. 2(B).

In the output adjustment of steps S5 and S9, a variation amount X of the output of the high frequency pulse is decided in accordance with the temperature measurement value T. Here, the variation amount of the output is a variation amount (difference) of the output before and after the adjustment. When the output adjustment of steps S5 and S9 is performed, the output of the high frequency pulse fluctuates (increases or decreases) by the variation amount X of the output corresponding to the temperature measurement value T.

When the temperature measurement value T exceeds the high temperature threshold value T2 (step S7, N), and the power measurement value P deviates from a predetermined power range (step S11, Y), the output adjustment by the high frequency oscillator 110 is performed as illustrated in FIG. 3 (step S13). When the power measurement value increases to exceed the predetermined power range in step S11, in step S13, an output reduction adjustment is performed. When the power measurement value falls below the predetermined power range in step S11, in step S13, an output increase adjustment is performed.

In the output adjustment of step S11, the variation amount Y of the output of the high frequency pulse is decided in accordance with the power measurement value P. When the output adjustment of step S11 is performed, the output of the high frequency pulse fluctuates (increases or decreases) by the variation amount Y of the output corresponding to the power measurement value P.

After steps S5, S9, or S13 is executed or when the power measurement value P does not deviate from a predetermined power range (step S11, N), the procedure returns to step S1 at a predetermined next timing, and a similar procedure is repeated. Here, a predetermined next timing can be appropriately set. For example, the high frequency pulse may be output a predetermined number of times, or when it is installed in the radar device, a timing after the distance measurement of the radar device may be set.

As a modified example of the flowchart illustrated in FIG. 4, when the temperature measurement value T exceeds the low temperature threshold value T1 and is equal to or less than the high temperature threshold value T2 which is higher than the low temperature threshold value T1, only the pulse adjustment illustrated in FIG. 2(C) may be performed. Further, when the temperature measurement value T is the low temperature threshold value T1 or less, the output adjustment of the high frequency oscillator 110 illustrated in FIG. 2(B) may be performed. Of course, when the temperature measurement value T is one threshold value or less, the output adjustment of pulse adjustment and the output adjustment of the high frequency oscillator 110 may be used in combination.

Figure 5:
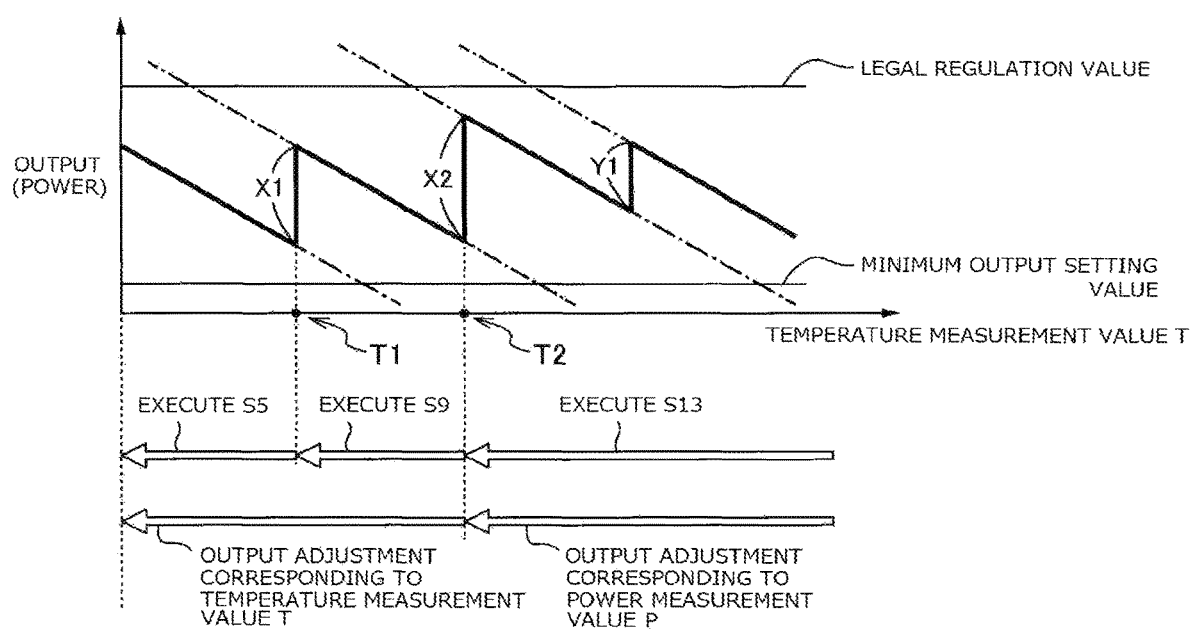
FIG. 5 is a diagram illustrating a temperature characteristic for an output of a pulse generating device adjusted as a first example on the basis of the flowchart of FIG. 4.

FIG. 5 illustrates the temperature characteristic for the output of the pulse generating device 100 adjusted as a first example on the basis of the flowchart of FIG. 4. In FIG. 5, a vertical axis indicates the output (power) of the pulse generating device 100 at a predetermined measurement frequency, and a horizontal axis indicates the temperature measurement value T acquired by the temperature measuring unit 170. The output of the high frequency pulse varies linearly with respect to the change of the temperature measurement value T, and the output increases as the temperature decreases. Therefore, when the output adjustment is not performed, as illustrated by an alternate long and short dash line, it increases while deviating from the legal regulation value or decreases while deviating from a minimum output setting value. The minimum output setting value is appropriately set on the basis of a detection limit of a receiving unit of the radar device or the like.

A solid line in FIG. 5 indicates a temperature characteristic of the high frequency pulse when the output adjustment is performed. In the flowchart of FIG. 4, step S5 is executed with a temperature range equal to or lower than a threshold value 1, but FIG. 5 illustrates an example in which, when the temperature measurement value T is equal to the low temperature threshold value T1, a variation corresponding to a variation amount X1 of the output corresponding to T1 occurs. Further, in FIG. 4 step S9 is executed in the temperature range which exceeds the low temperature threshold value T1 and is equal to or less than the high temperature threshold value T2, but FIG. 5 illustrates an example in which, when the temperature measurement value T is equal to the high temperature threshold value T2, a variation corresponding to a variation amount 2 of the output corresponding to T2 occurs. Further, in FIG. 4, step S13 is executed in the temperature range exceeding the high temperature threshold value T2, but FIG. 5 illustrates an example in which a variation corresponding to the variation amount Y1 of the output corresponding to the power measurement value P acquired by the power measuring unit 160 occurs.

As described above, in FIG. 5, the output adjustment in which the variation amounts of the output are X1, X2, and Y1 is illustrated three times in total, but the number of output adjustments may be increased, and the variation amount per output may be reduced, and in this case, a finer adjustment can be realized. Further, step S5 is executed when the temperature measurement value T is T1, and step S9 is executed when the temperature measurement value T is T2, but the output adjustment need not be necessarily performed only when the temperature measurement value T is equal to T1 and T2 and is performed appropriate in the temperature range according to the flowchart of FIG. 4.

Here, the variation amount Y of the output of the high frequency pulse when the high temperature threshold value T2 is exceeded (step S11) is realized by the output adjustment of the high frequency oscillator 110. The variation amount of the output of the high frequency oscillator 110 is adjusted in accordance with the power measurement value P. For example, a power threshold value (an upper limit or a lower limit) decided as a predetermined power range is compared with the power measurement value P, and if a difference therebetween is large, the variation amount of the output of the high frequency oscillator 110 is increased, and if the difference therebetween is small, the variation amount of the output of the high frequency oscillator 110 is adjusted to be small. Alternatively, the variation amount of the output of the high frequency oscillator 110 performed at one time is set as a fixed value, and the variation amount of the output of the high frequency oscillator 110 can be adjusted by adjusting the number of variations of the output. In other words, the number of one or more output adjustments and the variation amount output per output adjustment can be set in combination as appropriate.

The variation amount X of the output of the high frequency pulse at the high temperature threshold value T2 or less (steps S5 and S9) is realized by the output adjustment and the pulse adjustment of the high frequency oscillator 110. Here, the variation amount of the output of the high frequency oscillator 110 is decided in accordance with the temperature measurement value T. The variation amount of the output of the high frequency oscillator 110 corresponding to the temperature measurement value T can be set by evaluating the temperature characteristics of the components such as the high frequency oscillator 110 and the modulator 140 in advance.

In the first example, the variation amount of the output of the high frequency oscillator 110 which is adjusted in accordance with the temperature measurement value T is set to be greater than the variation amount of the output of the high frequency oscillator 110 which is adjusted in accordance with the power measurement value P. Accordingly, in the relatively low temperature region of the high temperature threshold value T2 or less, the variation amount of the output of the high frequency oscillator 110 performed at one time can be increased to reduce the number of variations of the output. It is possible to adjust the output of the pulse generating device 100 within a predetermined range with simpler control since the number of variations of the output is small.

Figure 6:
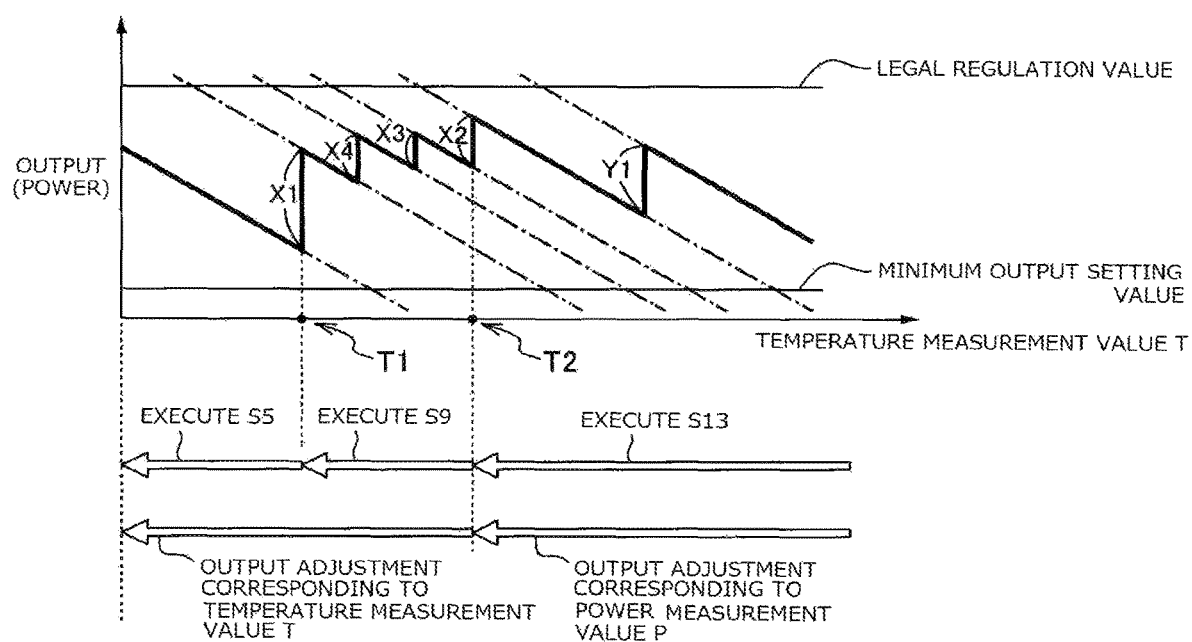
FIG. 6 is a diagram illustrating a temperature characteristic for an output of a pulse generating device adjusted as a second example on the basis of the flowchart of FIG. 4.

FIG. 6 illustrates a temperature characteristic for the output of the pulse generating device 100 adjusted as a second example on the basis of the flowchart of FIG. 4. In the second example, when the output of the high frequency oscillator 110 is adjusted in accordance with the temperature measurement value T in the temperature range which exceeds the low temperature threshold value T1 and is equal to or less than the high temperature threshold value T2, the variations of the output occurs twice or more. The variation amount of the output per variation is made smaller than the variation amount of the output of the high frequency oscillator 110 which is adjusted in accordance with the power measurement value P.

Accordingly, as illustrated in FIG. 6, in the temperature range which exceeds the low temperature threshold value T1 and is equal to or less than the high temperature threshold value T2, as compared with the example illustrated in FIG. 5, the number of output adjustments of the pulse generating device 100 is larger, and the variation amount of the output per variation is small. Specifically, the output adjustment in in which the variation amounts of the output are X2, X3, and X4 is executed three times in total, and a range in which an output of a vertical axis in X2, X3, and X4 varies is narrower than Y1. Since the range in which the output of the pulse generating device 100 varies is narrowed as described above, for example, the output can be adjusted within a relatively large level range. Therefore, when it is installed in the radar device, there is an advantage in that a detection capability of the radar device can be maintained at a high level.

In FIG. 6, in order to simplify a comparison with FIG. 5, the number of output adjustments is increased only in the temperature range which exceeds the low temperature threshold value T1 and is equal to or less than the high temperature threshold value T2, but the number of output adjustments can be set appropriately even in the other temperature ranges. In other words, the number of one or more output adjustments and the variation amount output per output adjustment can be set in combination as appropriate, and the output of the pulse generating device 100 can be adjusted within a predetermined range.

As described above, according to the pulse generating device 100 and the output generation method of the pulse generating device 100 of the invention, when the ambient temperature changes or aging deterioration occurs, the output of the high frequency pulse can be adjusted within a predetermined range in accordance with the measurement results of the power measuring unit 160 and the temperature measuring unit 170. In FIGS. 5 and 6, in the temperature range exceeding the high temperature threshold value T2, the output of the high frequency pulse can be adjusted by the output adjustment of the high frequency oscillator 110 in accordance with the measurement result of the power measuring unit 160. In the temperature range equal to or less than the high temperature threshold value T2, the output of the high frequency pulse can be adjusted by the output adjustment of the high frequency oscillator 110 in accordance with the measurement result of the temperature measuring unit 170. Further, in the temperature range equal to or less than the low temperature threshold value T1, the output of the high frequency pulse can be adjusted by the output adjustment and the pulse adjustment of the high frequency oscillator 110 in accordance with the measurement result of the temperature measuring unit 170.

Although the embodiment of the invention has been described above, the invention is not limited to the above embodiment and the examples, and various modifications can be made without departing from the gist thereof. For example, the pulse generating device 100 may include a calculation processing unit that stores the temperature characteristics of the high frequency oscillator 110 and the modulator 140 acquired in advance and calculates the variation amount of the output of the high frequency oscillator 110 decided in accordance with the temperature measurement value T and the power measurement value P or the like if necessary.

In the above embodiment and the examples, the legal regulation value is used as the upper limit of the adjustment range of the output of the pulse generating device 100, but other upper limits may be set so that the pulse generating device 100 may be adjusted without exceeding the upper limits.

EXPLANATIONS OF LETTERS OR NUMERALS

100 PULSE GENERATING DEVICE
110 HIGH FREQUENCY OSCILLATOR
120 BASEBAND PULSE GENERATING UNIT
121 PULSE GENERATOR
122 LOW PASS FILTER
123 PULSE PATTERN MEMORY
130 TIMING GENERATOR
140 MODULATOR
150 OUTPUT VARIABLE DEVICE
160 POWER MEASURING UNIT
170 TEMPERATURE MEASURING UNIT

The invention claimed is:

1. A pulse generating device of an in-vehicle radar configured to output a high frequency pulse including a main lobe and a side lobe, comprising:
   a high frequency oscillator configured to generate a carrier wave of a predetermined frequency;
   an output variable device configured to adjust an output of the high frequency oscillator;
   a power measuring device configured to measure the output of the high frequency oscillator, the power measuring device comprising an input coupled to an output of the high frequency oscillator, and an output coupled to an input of the output variable device;
   a temperature measuring device configured to measure an ambient temperature, the temperature measuring device comprising an output coupled to an input of the output variable device;
   a baseband pulse generating device configured to generate a signal of a pulse shape; and
   a modulator coupled to the baseband pulse generator and configured to modulate the output of the high frequency oscillator with the signal of the pulse shape, the modulator comprising an input coupled to an output of the high frequency oscillator,
   wherein, when the ambient temperature is a first threshold value or less, the pulse generating device adjusts at least one of the output and the pulse shape so that the side lobe is a predetermined output or less,
   wherein in a case in which, when the ambient temperature exceeds the first threshold value, the output variable device adjusts the output of the high frequency oscillator in accordance with the measurement result of the power measuring device, and when the ambient temperature is the first threshold value or less, the output variable device adjusts the output of the high frequency oscillator in accordance with the measurement result of the temperature measuring device,
   a variation amount of the output of the high frequency oscillator which is adjusted in accordance with the measurement result of the temperature measuring device is larger than a variation amount of the output of the high frequency oscillator which is adjusted in accordance with the measurement result of the power measuring device.

2. A pulse generating device configured to output an output of the modulator as a high frequency pulse, comprising:
   a high frequency oscillator configured to generate a carrier wave of a predetermined frequency;
   an output variable device configured to adjust an output of the high frequency oscillator;
   a power measuring device configured to measure the output of the high frequency oscillator, the power measuring device comprising an input coupled to an output of the high frequency oscillator, and an output coupled to an input of the output variable device;
   a temperature measuring device configured to measure an ambient temperature, the temperature measuring device comprising an output coupled to an input of the output variable device;
   a baseband pulse generating device including a pulse generator configured to generate a pulse having a predetermined pulse width and a low pass filter configured to adjust a shape of a pulse output from the pulse generator, the baseband pulse generating device generating a signal of a pulse shape; and
   a modulator coupled to the baseband pulse generator and configured to modulate the output of the high frequency oscillator with the signal of the pulse shape output from the baseband pulse generating device, the modulator comprising an input coupled to an output of the high frequency oscillator,
   wherein, when the ambient temperature exceeds a first threshold value, the output variable device adjusts the output of the high frequency oscillator in accordance with a measurement result of the power measuring device,
   wherein, when the ambient temperature is the first threshold value or less, an output of the high frequency pulse is adjusted within a predetermined range by performing at least one of adjusting the output of the high frequency oscillator by the output variable device and modifying and adjusting a shape of the signal of the pulse shape by the baseband pulse generating device in accordance with a measurement result of the temperature measuring device
   wherein in a case in which, when the ambient temperature exceeds the first threshold value, the output variable device adjusts the output of the high frequency oscillator in accordance with the measurement result of the power measuring device, and when the ambient temperature is the first threshold value or less, the output variable device adjusts the output of the high frequency oscillator in accordance with the measurement result of the temperature measuring device, and
   wherein a variation amount of the output of the high frequency oscillator which is adjusted in accordance with the measurement result of the temperature measuring device is larger than a variation amount of the output of the high frequency oscillator which is adjusted in accordance with the measurement result of the power measuring device.

3. A pulse generating device of an in-vehicle radar configured to output a high frequency pulse including a main lobe and a side lobe, comprising:
- a high frequency oscillator configured to generate a carrier wave of a predetermined frequency;
- an output variable device configured to adjust an output of the high frequency oscillator;
- a power measuring device configured to measure the output of the high frequency oscillator, the power measuring device comprising an input coupled to an output of the high frequency oscillator, and an output coupled to an input of the output variable device;
- a temperature measuring device configured to measure an ambient temperature, the temperature measuring device comprising an output coupled to an input of the output variable device;
- a baseband pulse generating device configured to generate a signal of a pulse shape; and
- a modulator coupled to the baseband pulse generator and configured to modulate the output of the high frequency oscillator with the signal of the pulse shape, the modulator comprising an input coupled to an output of the high frequency oscillator,
- wherein, when the ambient temperature is a first threshold value or less, the pulse generating device adjusts at least one of the output and the pulse shape so that the side lobe is a predetermined output or less,
- wherein in a case in which, when the ambient temperature exceeds the first threshold value, the output variable device adjusts the output of the high frequency oscillator in accordance with the measurement result of the power measuring device, and when the ambient temperature is the first threshold value or less, the output variable device adjusts the output of the high frequency oscillator in accordance with the measurement result of the temperature measuring device,
- the adjustment of the output of the high frequency oscillator according to the measurement result of the temperature measuring device includes causing the output of the high frequency oscillator to vary twice or more with a variation amount smaller than a variation amount of the output of the high frequency oscillator which is adjusted in accordance with the measurement result of the power measuring device.

4. A pulse generating device configured to output an output of the modulator as a high frequency pulse, comprising:
- a high frequency oscillator configured to generate a carrier wave of a predetermined frequency;
- an output variable device configured to adjust an output of the high frequency oscillator;
- a power measuring device configured to measure the output of the high frequency oscillator, the power measuring device comprising an input coupled to an output of the high frequency oscillator, and an output coupled to an input of the output variable device;
- a temperature measuring device configured to measure an ambient temperature, the temperature measuring device comprising an output coupled to an input of the output variable device;
- a baseband pulse generating device including a pulse generator configured to generate a pulse having a predetermined pulse width and a low pass filter configured to adjust a shape of a pulse output from the pulse generator, the baseband pulse generating device generating a signal of a pulse shape; and
- a modulator coupled to the baseband pulse generator and configured to modulate the output of the high frequency oscillator with the signal of the pulse shape output from the baseband pulse generating device, the modulator comprising an input coupled to an output of the high frequency oscillator,
- wherein, when the ambient temperature exceeds a first threshold value, the output variable device adjusts the output of the high frequency oscillator in accordance with a measurement result of the power measuring device, wherein, when the ambient temperature is the first threshold value or less, an output of the high frequency pulse is adjusted within a predetermined range by performing at least one of adjusting the output of the high frequency oscillator by the output variable device and modifying and adjusting a shape of the signal of the pulse shape by the baseband pulse generating device in accordance with a measurement result of the temperature measuring device,
- wherein in a case in which, when the ambient temperature exceeds the first threshold value, the output variable device adjusts the output of the high frequency oscillator in accordance with the measurement result of the power measuring device, and when the ambient temperature is the first threshold value or less, the output variable device adjusts the output of the high frequency oscillator in accordance with the measurement result of the temperature measuring device,
- wherein the adjustment of the output of the high frequency oscillator according to the measurement result of the temperature measuring device includes causing the output of the high frequency oscillator to vary twice or more with a variation amount smaller than a variation amount of the output of the high frequency oscillator which is adjusted in accordance with the measurement result of the power measuring device.

5. The pulse generating device according to claim 1, wherein, when the ambient temperature is equal to or lower than a second threshold value which is lower than the first threshold value, the output variable device adjusts the output of the high frequency oscillator and the baseband pulse generating device modifies and adjusts a shape of the signal of the pulse shape in accordance with the measurement result of the temperature measuring device.

6. The pulse generating device according to claim 2, wherein, when the ambient temperature is equal to or lower than a second threshold value which is lower than the first threshold value, the output variable device adjusts the output of the high frequency oscillator and the baseband pulse generating device modifies and adjusts a shape of the signal of the pulse shape in accordance with the measurement result of the temperature measuring device.

7. The pulse generating device according to claim 1, wherein the baseband pulse generating device further includes a pulse generator configured to generate a pulse having a predetermined pulse width and a timing generator configured to output a control signal to the pulse generator, and the pulse generator generates a pulse string.

8. The pulse generating device according to claim 2, wherein the baseband pulse generating device further includes a pulse generator configured to generate a pulse having a predetermined pulse width and a timing generator configured to output a control signal to the pulse generator, and the pulse generator generates a pulse string.

9. The pulse generating device according to claim 1, wherein the baseband pulse generating device further includes a pulse generator configured to generate a pulse having a predetermined pulse width and a pattern memory configured to store a control pattern when a predetermined pulse pattern is output from the pulse generator.

10. The pulse generating device according to claim 2, wherein the baseband pulse generating device further includes a pulse generator configured to generate a pulse having a predetermined pulse width and a pattern memory configured to store a control pattern when a predetermined pulse pattern is output from the pulse generator.

11. An output adjustment method of a pulse generating device of an in-vehicle radar configured to modulate a carrier wave of a predetermined frequency with a signal of a pulse shape and output a resulting signal as a high frequency pulse including a main lobe and a side lobe, the output adjustment method comprising:
   acquiring a power measurement value of the carrier wave;
   acquiring a temperature measurement value of an ambient temperature;
   adjusting an output of the carrier wave; and
   modifying and adjusting a shape of the signal of the pulse shape,
   wherein, when the temperature measurement value is a first threshold value or less, at least one of adjusting the output of the carrier wave so that the side lobe is a predetermined output or less and modifying and adjusting the shape of the signal of the pulse shape is performed by the output adjustment method,
   wherein, in a case in which, when the temperature measurement value exceeds a first threshold value, the adjusting the output of the carrier wave in accordance with the power measurement value is performed, and when the temperature measurement value is the first threshold value or less, the adjusting the output of the carrier wave in accordance with the temperature measurement value is performed,
   a variation amount of the output of the carrier wave which is adjusted in accordance with the temperature measurement value is greater than a variation amount of the output of the carrier wave which is adjusted in accordance with the power measurement value.

12. An output adjustment method used in a pulse generating device configured to modulate a carrier wave of a predetermined frequency with a signal of a pulse shape and output a resulting signal as a high frequency pulse, the output adjustment method comprising:
   acquiring a power measurement value of the carrier wave;
   acquiring a temperature measurement value of an ambient temperature;
   adjusting an output of the carrier wave in accordance with the power measurement value;
   adjusting the output of the carrier wave in accordance with the temperature measurement value; and
   modifying and adjusting a shape of the signal of the pulse shape in accordance with the temperature measurement value,
   wherein, when the temperature measurement value exceeds a first threshold value, adjusting the output of the carrier wave in accordance with the power measurement value is performed, and
   when the temperature measurement value is the first threshold value or less, the output of the high frequency pulse is adjusted within a predetermined range by performing at least one of adjusting the output of the carrier wave and modifying or adjusting a shape of the signal of the pulse shape in accordance with the temperature measurement value
   wherein, in a case in which, when the temperature measurement value exceeds a first threshold value, the adjusting the output of the carrier wave in accordance with the power measurement value is performed, and when the temperature measurement value is the first threshold value or less, the adjusting the output of the carrier wave in accordance with the temperature measurement value is performed,
   a variation amount of the output of the carrier wave which is adjusted in accordance with the temperature measurement value is greater than a variation amount of the output of the carrier wave which is adjusted in accordance with the power measurement value.

13. An output adjustment method of a pulse generating device of an in-vehicle radar configured to modulate a carrier wave of a predetermined frequency with a signal of a pulse shape and output a resulting signal as a high frequency pulse including a main lobe and a side lobe, the output adjustment method comprising:
   acquiring a power measurement value of the carrier wave;
   acquiring a temperature measurement value of an ambient temperature;
   adjusting an output of the carrier wave; and
   modifying and adjusting a shape of the signal of the pulse shape,
   wherein, when the temperature measurement value is a first threshold value or less, at least one of adjusting the output of the carrier wave so that the side lobe is a predetermined output or less and modifying and adjusting the shape of the signal of the pulse shape is performed by the output adjustment method,
   wherein, in a case in which, when the temperature measurement value exceeds a first threshold value, the adjusting the output of the carrier wave in accordance with the power measurement value is performed, and when the temperature measurement value is the first threshold value or less, the adjusting the output of the carrier wave in accordance with the temperature measurement value is performed,
   the adjustment of the output of the carrier wave according to the temperature measurement value includes causing the output of the carrier wave to vary twice or more with a variation amount smaller than a variation amount of the output of the carrier wave which is adjusted in accordance with the power measurement value.

14. An output adjustment method used in a pulse generating device configured to modulate a carrier wave of a predetermined frequency with a signal of a pulse shape and output a resulting signal as a high frequency pulse, the output adjustment method comprising:
   acquiring a power measurement value of the carrier wave;
   acquiring a temperature measurement value of an ambient temperature;
   adjusting an output of the carrier wave in accordance with the power measurement value;
   adjusting the output of the carrier wave in accordance with the temperature measurement value; and
   modifying and adjusting a shape of the signal of the pulse shape in accordance with the temperature measurement value,
   wherein, when the temperature measurement value exceeds a first threshold value, adjusting the output of the carrier wave in accordance with the power measurement value is performed, and when the temperature measurement value is the first threshold value or less, the output of the high frequency pulse is adjusted within a predetermined range by performing at least one of adjusting the output of the carrier wave and a modifying or adjusting a shape of the signal of the pulse shape in accordance with the temperature measurement value, wherein, in a case in which, when the temperature measurement value exceeds a first threshold value, the adjusting the output of the carrier wave in accordance with the power measurement value is performed, and when the temperature measurement value is the first threshold value or less, the adjusting the output of the carrier wave in accordance with the temperature measurement value is performed, the adjustment of the output of the carrier wave according to the temperature measurement value includes causing the output of the carrier wave to vary twice or more with a variation amount smaller than a variation amount of the output of the carrier wave which is adjusted in accordance with the power measurement value.

15. The output adjustment method of the pulse generating device according to claim 11, wherein, when the temperature measurement value is equal to or lower than a second threshold value which is lower than the first threshold value, both of the adjusting the output of the carrier wave and the modifying and adjusting the shape of the signal of the pulse shape are performed in accordance with the temperature measurement value.

16. The output adjustment method of the pulse generating device according to claim 12, wherein, when the temperature measurement value is equal to or lower than a second threshold value which is lower than the first threshold value, both of the adjusting the output of the carrier wave and the modifying and adjusting the shape of the signal of the pulse shape are performed in accordance with the temperature measurement value.

17. The output adjustment method of the pulse generating device according to claim 11, wherein the signal of the pulse shape is generated on the basis of a pulse string including two or more monopulses of a predetermined pulse width, and in the modifying and adjusting the shape of the signal of the pulse shape within a predetermined range, at least one of the pulse width, the number of monopulses, and an interval between the monopulses is adjusted.

18. The output adjustment method of the pulse generating device according to claim 12, wherein the signal of the pulse shape is generated on the basis of a pulse string including two or more monopulses of a predetermined pulse width, and in the modifying and adjusting the shape of the signal of the pulse shape within a predetermined range, at least one of the pulse width, the number of monopulses, and an interval between the monopulses is adjusted.

* * * * *